United States Patent [19]

Navazo

[11] Patent Number: 5,013,870
[45] Date of Patent: May 7, 1991

[54] BOX FOR CONTAINING ELECTRICAL MECHANISMS

[75] Inventor: Juan M. B. Navazo, Barcelona, Spain

[73] Assignee: Aparellaje Electrico, S.A., Barcelona, Spain

[21] Appl. No.: 502,682

[22] Filed: Apr. 2, 1990

[30] Foreign Application Priority Data

Apr. 14, 1989 [ES] Spain .................................. 8901307

[51] Int. Cl.[5] .............................................. H01J 5/00
[52] U.S. Cl. .......................................... 174/50; 174/97
[58] Field of Search .................. 174/50, 68.3, 97, 101;
361/380, 390, 391; 52/220, 221; 220/3.2, 3.3,
3.4, 3.5, 3.6, 3.7, 3.8, 3.9, 3.92, 3.94

[56] References Cited

U.S. PATENT DOCUMENTS

| 3,809,799 | 5/1974 | Taylor | 174/68.3 |
| 3,927,698 | 12/1975 | Johannsen | 138/162 |
| 4,156,795 | 5/1979 | Lacan | 174/97 |
| 4,710,853 | 12/1987 | Reinhardt | 361/391 |
| 4,953,735 | 9/1990 | Tisbo et al. | 220/6 |

FOREIGN PATENT DOCUMENTS

| 1276153 | 8/1968 | Fed. Rep. of Germany | 174/97 |
| 3113679 | 10/1982 | Fed. Rep. of Germany | 174/68.3 |
| 561969 | 5/1975 | Switzerland | 174/101 |

Primary Examiner—Leo P. Picard
Assistant Examiner—Bot L. Ledynh
Attorney, Agent, or Firm—Staas & Halsey

[57] ABSTRACT

An integral box attached to harpoon-shaped projections in the bottom of a channel-like duct member for electrical wiring by way of a fixed appendage and a pivotable locking tab. The latter has a lower portion extending below the base of the box and an upper portion. The lower portion is provided with a retaining appendage for a harpoon-shaped projection and the upper portion is provided with a locking mechanism.

5 Claims, 4 Drawing Sheets

BOX FOR CONTAINING ELECTRICAL MECHANISMS

BACKGROUND OF THE INVENTION

1. Field of the Invention

The present invention relates to a box for containing electrical mechanisms, which box may be installed in ducting for electrical wiring or the like which comprise a bottom with which there is associated at least one first and one second oppositely facing harpoon-shaped projections, which are attached to the bottom by at least one rib portion, the box having a base and side walls.

Particularly, said mechanisms are commonly used for connection, circuit-breaking, branching or protection functions in electrical, telephone, data processing or other installations disposed in channel-like duct members having a cover member and attached to walls or other vertical surfaces.

2. Description of the Prior Art

Several embodiments of this type of box are known. Thus, Spanish Utility Model No. 206,123 relates to a box for installation in channel-like duct members the bottom wall of which is provided with T-shaped longitudinal grooves, while the box has the bottom wall thereof provided with aligned slots through which the bent ends of a retaining member for engagement in said slots extend such that the edge of said member opposite said bent ends engages with a resilient tab extending from a side wall of the box. This solution has the drawback of having two members to assemble.

Spanish Utility Model No. 223,179 discloses a box having a base provided with two slots aligned about either side of the center line of the base, said slots having on both sides a resilient tab and wherein there extends a block attached to the box by a thin angular torsion hinge plate which allows the block to rock as a lever-wedge. In this case, the box is not retained as stably as required in the channel-like duct member.

The box disclosed in Spanish Utility Model No. 224,727 is provided in the bottom thereof with a salient flange which is removably and slidingly snap fitted in a support guide located in the bottom of the channel-like duct member, plus an aperture through which there is assembled a moving member having an outwardly extending angled lip flanked by an also salient edge, while the other flank forms a protuberance having fins for retention in the said aperture, said moving element also having a rear orifice for its removal by leverage. This embodiment has the drawback that it is difficult to manipulate the moving member from the outside of the box.

French Patent Application No. 78.25732 discloses a box having in the bottom thereof a slot mating with a T-shaped guide in the bottom of a channel-like duct member, there being in said box bottom a fold-down metal plate having an elbow which passes through the slot and the engages the box groove, said plate being retained under a tab extending from one of the box walls. Furthermore, the said metal plate is provided with an insulating protection formed by a resilient leaf extending from one edge of the box slot. This embodiment has the drawback of an extremely complex constitution which does not provide any improvement to the attachment of the box to the channel-like duct member.

SUMMARY OF THE INVENTION

It is an object of the invention to overcome the drawbacks of the prior art embodiments and simplify the making thereof.

This object is attained with a box of the type described at the beginning which is characterized by being formed by a single piece comprising: legs for supporting on the bottom of the channel-like duct member; a fixed positioning appendage adapted to engage below said first harpoon-shaped projection; an aperture in said base defining first and second opposed edges; a neb-like ridge adjacent said first edge having first locking means; a wall portion adjacent said second edge; and a locking tab hingedly connected to said wall portion, capable of pivoting between a lower locking position and an upper free position, said tab comprising in turn: an upper portion having second locking means complementary to said first locking means adapted jointly removeably to retain said tab in said lower locking position; and a lower portion having a retaining appendage adapted to engage below said second harpoon-shaped projection when said tab is in said lower locking position.

BRIEF DESCRIPTION OF THE DRAWINGS

Further advantages and features of the invention will be appreciated from the following description wherein without any limiting nature there is described a preferred embodiment of the invention with reference to the accompanying drawings. In the drawings.

DETAILED DESCRIPTION OF THE INVENTION

Figure 1:
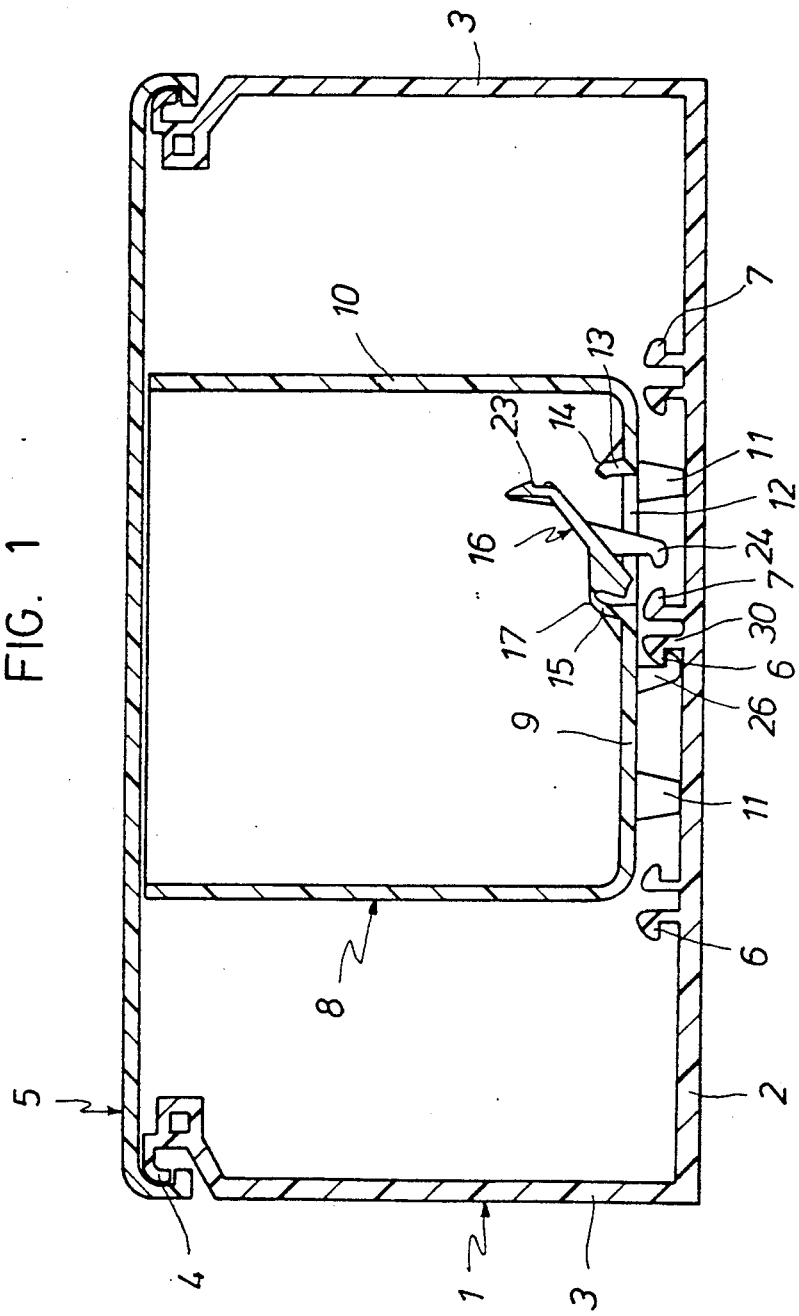
FIG. 1 is a cross section view of a channel-like duct member for electrical wiring containing the box of the invention.
Figure 2:
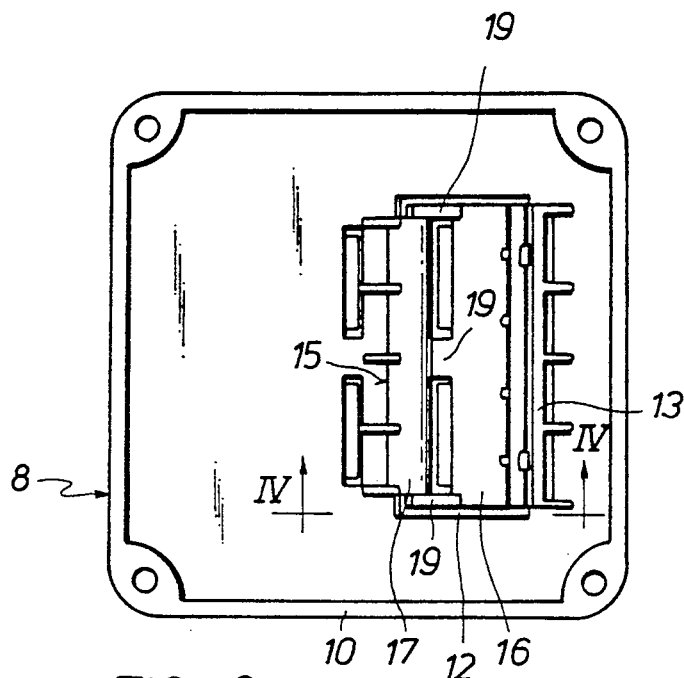
FIG. 2 is a plan view from above the box, with the locking tab in the free upper position thereof.
Figure 3:
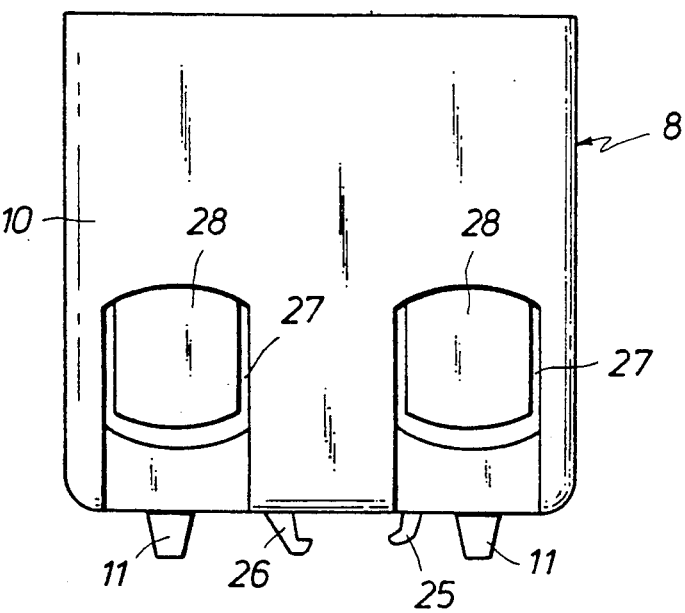
FIG. 3 is an elevation view of the box.
Figure 4:
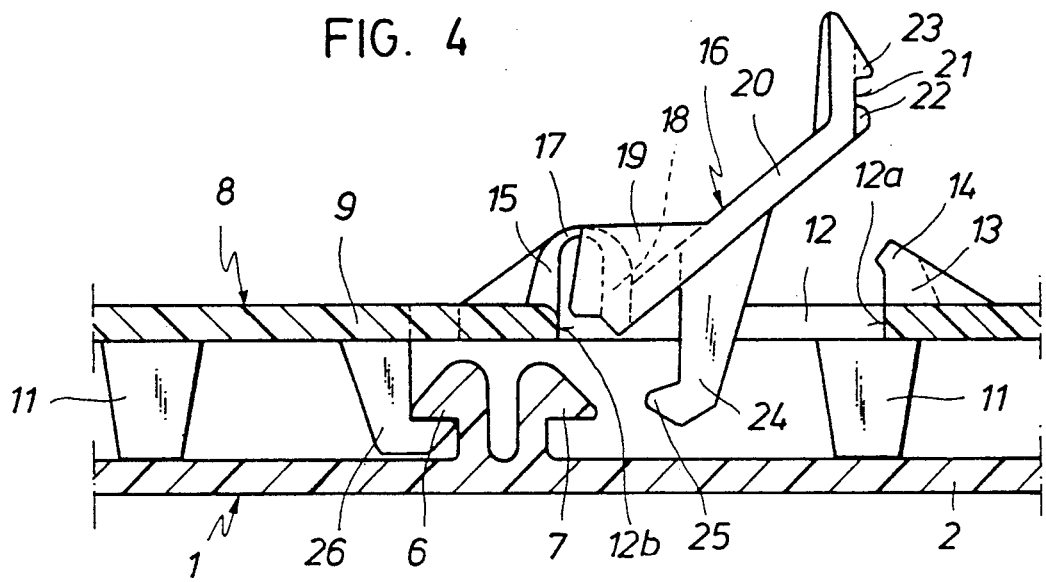
FIG. 4 is a part section view on the line IV—IV of FIG. 2, said section showing also the bottom of the channel-like member.

In FIG. 1 there is to be seen a channel-like duct member 1 for electrical wiring and the like comprising a bottom 2 and side walls 3, having upper flanges 4 for engaging a cover member 5 which is appropriately shaped for said engagement.

The bottom 2 of the channel-like member 1 is provided, in a known way, with a plurality of first harpoon-shaped projections 6 and second harpoon-shaped projections 7 which are oriented in opposite directions in paris. Each pair of harpoon-shaped projections is attached to the bottom 2 by a common rib portion or, as shown in the drawing, by a rib portion 30 for each projection.

The box 8 of the invention is formed by a single, preferably moulded piece. It compris a base 9 and side walls 10 and the base is provided with legs 11 for resting on the bottom 2 of the channel-like member 1.

The base is also provided with a preferably rectangular aperture 12 defining opposed preferably also parallel first and second edges 12a and 12b. Immediately adjacent the first edge 12a there is a neb-like ridge 13 having first locking means, preferably formed by a horizontally extending tooth 14 parallel to the base 9.

Figure 5:
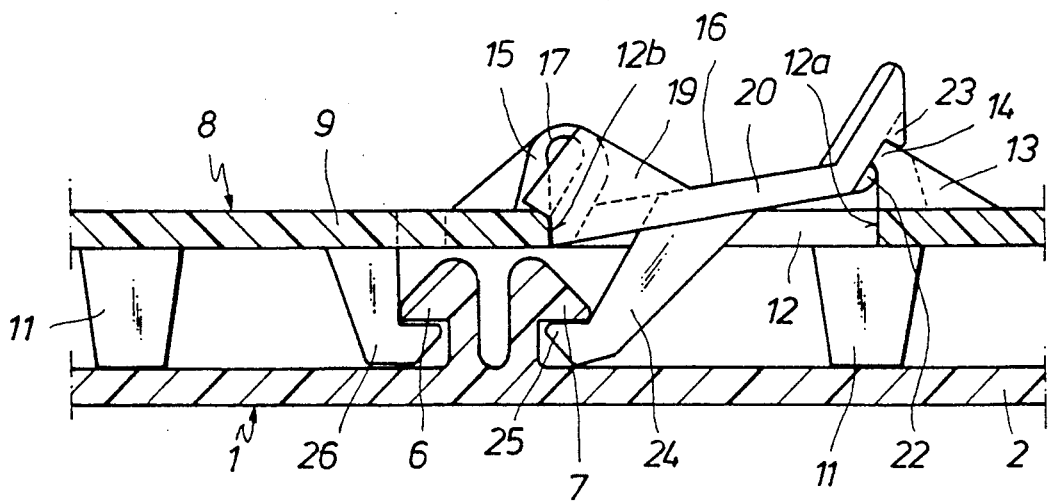
FIG. 5 is a cross section view similar to the previous Figure, showing the locking tab in the lower locking position thereof.
Figure 6:
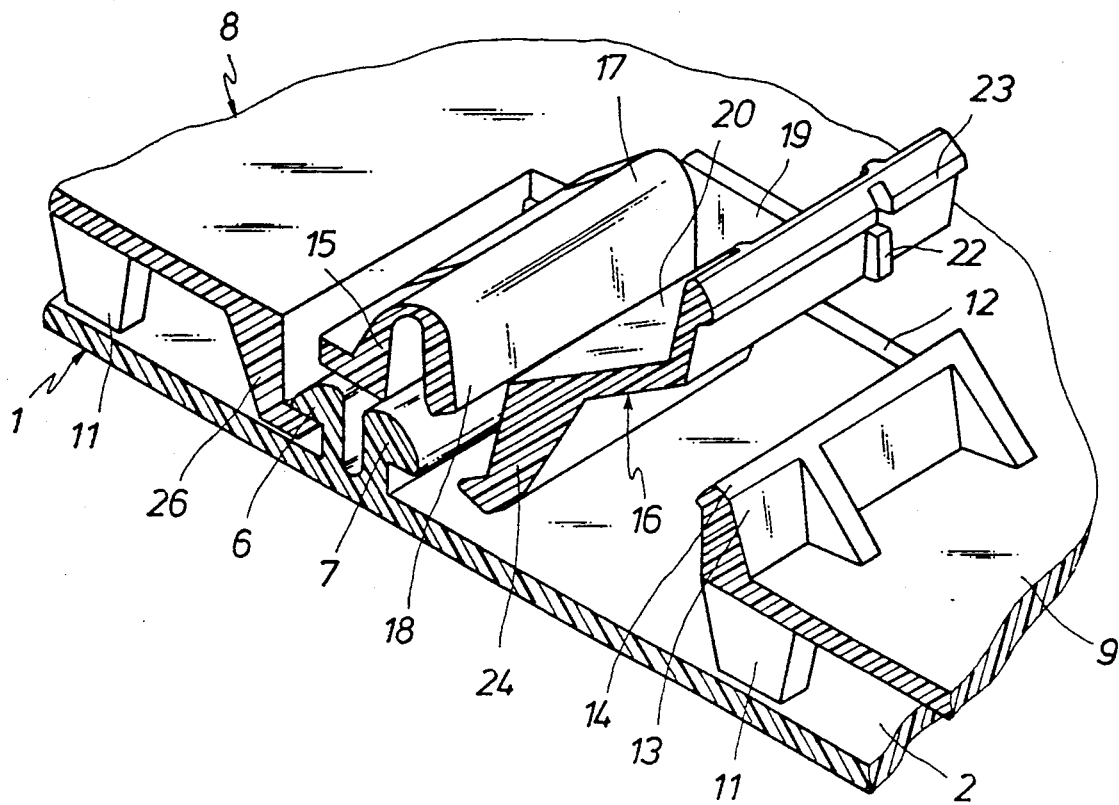
FIGS. 6 and 7 are perspective views, in section on a vertical plane, corresponding respectively to the view of FIGS. 4 and 5.
Figure 7:
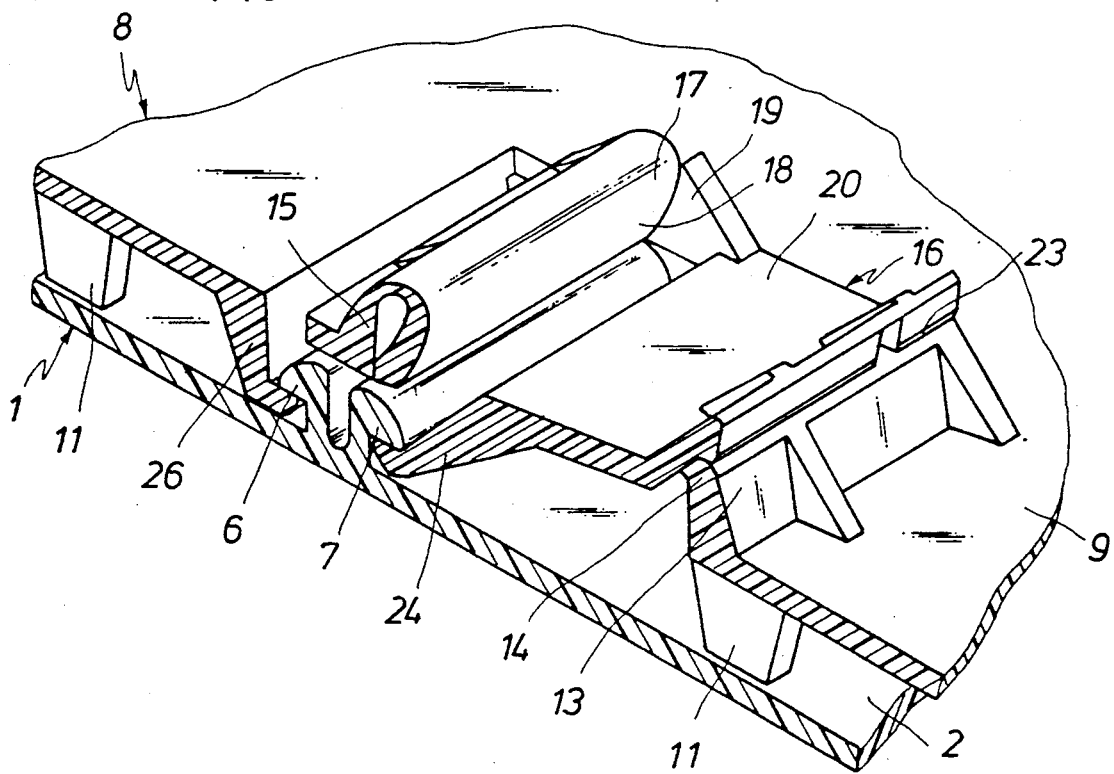

Also adjacent the second edge 12b there is a wall portion 15 attached to a locking tab 16 by a hinge means allowing the tab 16 to pivot between a free upper position (FIGS. 1, 2, 4 and 6) and a lower locking position (FIGS. 5 and 7). Preferably said hinge means comprises an arcuate leaf 17 the reduced thickness of which provides the necessary resilience. The leaf 17 is integral with the piece forming the box 8 and extends between the wall portion 15 and a flattened member 18 which is attached to the tab 16 by way of gussets 19.

The locking tab 16 comprises an upper portion 20 on which there are located second locking means complementing the said first locking means. Preferably the said second locking means comprises a recess 21 for the tooth 14. Below the recess there is a boss 22 the front surface of which may slide over the tooth 14 to be located thereunder in the locking position. Above the recess 21 there is a flange 23 which abuts the tooth 14 to limit the pivoting movement.

The tab comprises also a lower portion 24 having a retaining appendage 25. When the tab is in the lower locking position thereof, the appendage 25 engages the lower surface of the second harpoon-shaped projection 7.

From the lower surface of the base 9 there extends downwardly a fixed positioning appendage 26 adapted, in turn, to engage the lower surface of the first harpoon-shaped projection 6.

So that wiring may accede to the interior of the box 8, it is contemplated that the latter has windows 27 on the side walls 10 thereof, covered by thin resilient membranes 28 which may be easily moved aside for said access.

The way of attaching the box 8 to the channel-like duct member 1 is obvious for the foregoing description. With the tab 16 in the free upper position, the box 8 is placed over a pair of projections 6 and 7 in such a way that the legs 11 are resting on the bottom 2 and the box 8 is moved slightly in a transverse direction until the fixed positioning apendage 26 is engaged under one of the harpoon-shaped projections 6 or 7. Thereafter the locking tab 16 is pivoted to the lower locking position in such a way that the boss 22 slides over the tooth 14, which is posible because of the slight resilience of the tab 16. At the same time the retaining appendage 25 is pressed against the other harpoon-shaped projection 7 or 6 (i.e. the projection not engaging the fixed appendage 26). In this way the box 8 is effectively attached to the channel-like duct member 1 in a way not preventing longitudinal sliding along the rib portions 30. This attachment may be easily released by pivoting the tab back towards the free upper position.

What I claim is:

1. A box for containing electrical mechanisms which may be installed in channel-like duct members for electrical wiring or the like which comprise a bottom with which there is associated at least one first and one second oppositely facing harpoon-shaped projections, which are attached to the bottom by at least one rib portion, said box having a base and side walls, said box being formed by a single piece comprising: legs for supporting on the bottom of the channel-like duct member; a fixed positioning appendage adapted to engage below said first harpoon-shaped projection; an aperture in said base defining first and second opposed edges; a neb-like ridge adjacent said first edge having first locking means; a wall portion adjacent said second edge; and a locking tab hingedly connected to said wall portion, capable of pivoting between a lower locking position and an upper free position, said tab comprising in turn: an upper portion having second locking means complementary to said first locking means adapted jointly removeably to retain said tab in said lower locking position; and a lower portion having a retaining appendage adapted to engage below said second harpoon-shaped projection when said tab is in said lower locking position.

2. The box of claim 1, wherein said first locking means comprises a tooth and said second locking means defines a recess space for said tooth, there being on said locking tab a flange limiting the pivoting movement.

3. The box of claim 1, wherein said hinged connection comprises a resilient arcuate leaf of reduced thickness integral with said single piece.

4. The box of claim 3, wherein said leaf extends between said wall portion and a flattened member rigidly attached to said locking tab by gussets.

5. The box of claim 1, wherein said side walls of the box are provided with windows partially covered with thin resilient membranes.

* * * * *